Oct. 15, 1929.                L. E. DE NEERGAARD                1,731,455
                                  TRANSPORTER
                              Filed Jan. 16, 1928
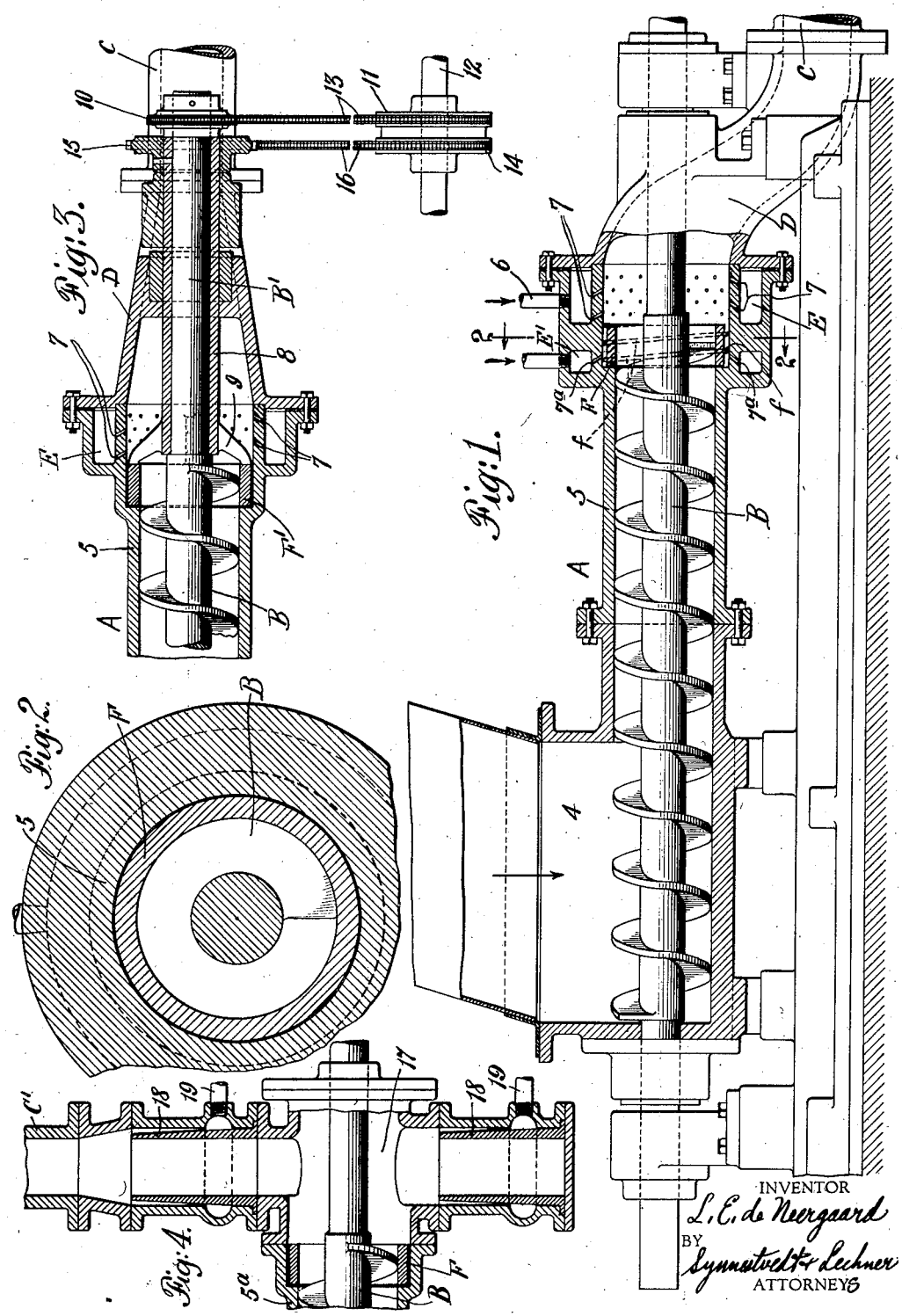
INVENTOR
L. E. de Neergaard
BY
Synnestvedt & Lechner
ATTORNEYS Patented Oct. 15, 1929

1,731,455

UNITED STATES PATENT OFFICE

LEIF ERIC DE NEERGAARD, OF CHICAGO, ILLINOIS, ASSIGNOR TO INTERNATIONAL COMBUSTION ENGINEERING CORPORATION, A CORPORATION OF DELAWARE

TRANSPORTER

Application filed January 16, 1928. Serial No. 246,939.

This invention relates to transporters for finely divided material and in particular to improvements in that class of transporting apparatus in which material such as pulverized coal is advanced from a suitable source of supply by means of a screw to an air transport line leading to any desired terminus.

It is well known that in this class of apparatus provision must be made to prevent the air employed in the transport line from blowing back through the screw if a successful device is to be produced.

It is one of the primary objects of my invention to provide an effective transport device in which such blowing back is prevented, and this without complicated mechanisms, excessive wear or heavy power consumption.

Another object of my invention is to ensure against such blowing back in a device of the character described in which the cross sectional area of the passage provided by the screw and barrel through which the material must pass is the same at all points from the intake to the discharge end of the screw.

How the foregoing, together with such other objects and advantages as may hereinafter appear, or are incident to my invention are realized, is illustrated in preferred form in the accompanying drawings, wherein—

Fig. 1 is a side elevation, partly in section of a transporter embodying my invention.

Fig. 2 is an enlarged cross section taken on the line 2—2 thereof.

Fig. 3 is a fragmentary horizontal section through a portion of a modified form of transporter, and Fig. 4 is a fragmentary horizontal section through a portion of another modified form of transporter.

Referring now more particularly to Figs. 1 and 2, the transporter comprises, in general, a casing A having a hopper portion 4 or inlet for receiving the material to be transported, and a barrel portion 5 through which the material is advanced; a feed screw B for advancing the material through the barrel 5; a transport line C; a discharge connection D between the discharge end of the barrel 5, and the inlet end of the transport line C; and an air chamber E at the discharge end of the barrel to which pressure fluid is admitted by means of a pipe 6 and from which the fluid discharges into the transport line by means of a plurality of openings 7.

At the discharge end of the barrel 6 I have provided a rotatable neck or discharge throat F in the form of a collar preferably rotating with the screw through which material advanced by the screw must pass before entering the discharge connection D. The screw is a non-differential pitch screw, i. e., its pitch is constant throughout its length, as is its diameter.

In apparatus of this general type, in which the coal is gravity fed to a screw revolving at a high rate of speed, some of the coal is centrifugally rejected by the screw, with the result that the flights of the screw within the barrel of the device are only partly filled, thus leaving a space through which the air employed in the transport line for transporting the coal through the line can blow back through the screw. Various attempts have been made to overcome such blow back, for example, by means of tightly compacting the material at the discharge end of the screw.

I overcome this in my apparatus in the following manner:

The screw B advances the coal through the barrel 5 and it enters the rotatable neck or throat F. In this throat the coal is not advanced by that part of the screw enshrouded by the throat, but the coal merely rotates with the screw and the throat. The throat fills and the body of the coal therein is moved forwardly by the coal being advanced toward the throat by the screw. In consequence of the action described there is a disc of coal formed and continually maintained in the throat and at least a part of the flights of the screw in the region of the throat become filled, thus eliminating any possibility of any space through which blow back may occur. Furthermore, by my arrangement wear at the end of the screw is reduced to a negligible amount, it being observed in this connection that the material as it leaves the delivery terminus of the screw rotates at the same speed as the screw whereby the frictional wear to which the screw is subject at this point is merely that caused by the axial displacement of the material into the air stream or transport line.

In order to prevent material from collecting and packing in the clearance space between the neck and barrel, I have provided a helical thread *f* of coarse pitch on the outer peripheral portion of the neck, which thread propels material tending to collect in the clearance space out of the space, with the result that clogging is avoided and friction reduced.

An annular air chamber E' having a plurality of discharge openings 7ª leading to the clearance space referred to may be provided for the purpose of further insuring against lodging and building up of material in such space.

Referring to the modification illustrated in Fig. 3, the rotatable neck F' may be rotated at a speed slower or faster than that of the screw B by means of suitable mechanism such as will now be described.

The collar F' is rotatably supported on the screw shaft B' by means of the hub 8 and webs 9. A sprocket wheel 10 is secured to the screw shaft to rotate therewith. The sprocket 10 drives a sprocket 11 mounted on a countershaft 12 by means of the chain 13. A second sprocket 14 on this countershaft drives a sprocket 15 which is secured to the hub 8 by means of the chain 16, thus causing rotation of the collar F'. The rotative speed differential between the screw B and the collar F' is controlled by the ratio of the diameters of the sprockets. Therefore, the collar may be rotated at a slower or higher speed than the screw.

In Figure 4 I have shown a modification in which the axis of the transport line C' is disposed at right angles to the axis of the screw B. In this form the coal leaving the rotatable neck F is delivered into the T 17 and is subjected to pneumatic pressure by the air admission devices 18, 18, and is thereby advanced through the line C'. The air is admitted to the devices 18, 18, by means of the pipes 19 leading from a source of pressure air supply.

I claim:—

1. In a transporting device for finely divided material of the type in which the material is advanced by means of a screw through a barrel and into an air transport line, the combination of a rotatable neck for the barrel through which the material is passed by the screw and from which it discharges into the transport line, said rotatable neck having means on the outer periphery thereof for preventing material from lodging between the neck and the barrel.

2. In a transporting device for finely divided material of the type in which the material is advanced by means of a screw through a barrel and into an air transport line, the combination of a rotatable neck for the barrel through which the material is passed by the screw and from which it discharges into the transport line, said rotatable neck being screw threaded on its outer periphery whereby material tending to collect in the clearance space between the neck and barrel is propelled out of the space.

3. The combination with a transporting device for finely divided material including a feeder barrel, a feed screw, a transport line and means for introducing pressure fluid into said line, of means for keeping flights of the screw in said barrel filled with material comprising a rotatable collar through which the material must pass before entering the transport line, together with means for admitting air to the clearance space between said rotatable collar and the feeder barrel.

4. The combination with a transporting device for finely divided material including a feeder barrel, a feed screw, a transport line and means for introducing pressure fluid into said line, of a rotating collar associated with the feed screw, said rotating collar having a bore equal to the bore of the barrel and constituting a continuation of the barrel at the discharge end thereof.

5. The combination with a transporting device for finely divided material including a feeder barrel, a feed screw, a transport line and means for introducing pressure fluid into said line, of a collar secured to the screw at the discharge end thereof and rotatable therewith, the bore of said collar being equal to the bore of the barrel.

6. The combination with a transporting device for finely divided material including a feeder barrel, a feed screw, a transport line and means for introducing pressure fluid into said line, of means for keeping flights of the screw in said barrel filled with material comprising a rotatable collar through which the material must pass before entering the transport line.

In testimony whereof I have hereunto signed my name.

LEIF ERIC DE NEERGAARD.